(12) United States Patent
Seo et al.

(10) Patent No.: US 12,265,741 B2
(45) Date of Patent: Apr. 1, 2025

(54) METHOD AND APPARATUS WITH UNIFIED VIRTUAL MEMORY MANAGEMENT

(71) Applicant: SAMSUNG ELECTRONICS CO., LTD., Suwon-si (KR)

(72) Inventors: Wonik Seo, Suwon-si (KR); Dong-Uk Ryu, Suwon-si (KR); Sungduk Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/345,492

(22) Filed: Jun. 30, 2023

(65) Prior Publication Data

US 2024/0211177 A1    Jun. 27, 2024

(30) Foreign Application Priority Data

Dec. 27, 2022   (KR) .................. 10-2022-0185933

(51) Int. Cl.
*G06F 3/06*       (2006.01)
(52) U.S. Cl.
CPC .......... *G06F 3/0665* (2013.01); *G06F 3/0604* (2013.01); *G06F 3/0673* (2013.01)

(58) Field of Classification Search
CPC ..... G06F 3/0665; G06F 3/0604; G06F 3/0673
See application file for complete search history.

(56) References Cited

U.S. PATENT DOCUMENTS

| | | | |
|---|---|---|---|
| 10,319,060 B2 | 6/2019 | Rao et al. | |
| 10,782,897 B2 | 9/2020 | Sekiyama et al. | |
| 2015/0206277 A1* | 7/2015 | Rao ........................... | G06T 1/60 345/543 |
| 2019/0286991 A1* | 9/2019 | Lee ........................... | G06T 1/60 |
| 2022/0171708 A1* | 6/2022 | Lee ........................ | G06F 12/084 |
| 2022/0179717 A1* | 6/2022 | Brockmann .............. | G06T 1/60 |
| 2022/0214825 A1* | 7/2022 | Ganguly ................ | G06F 3/0647 |
| 2022/0245454 A1 | 8/2022 | Sridharan et al. | |
| 2022/0350484 A1* | 11/2022 | Vankamamidi ....... | G06F 12/126 |

FOREIGN PATENT DOCUMENTS

| | | |
|---|---|---|
| KR | 10-0998212 B1 | 12/2010 |
| KR | 10-2197247 B1 | 12/2020 |

\* cited by examiner

*Primary Examiner* — Jason W Blust
(74) *Attorney, Agent, or Firm* — NSIP Law (57) ABSTRACT

A method including updating memory allocation information of a UVM based on block information of model data blocks used for an execution of a deep learning model by a deep learning framework, and performing a least recently used (LRU) eviction based on the updated memory allocation information.

19 Claims, 8 Drawing Sheets

METHOD AND APPARATUS WITH UNIFIED VIRTUAL MEMORY MANAGEMENT

CROSS-REFERENCE TO RELATED APPLICATIONS

This application claims the benefit under 35 USC § 119(a) of Korean Patent Application No. 10-2022-0185933, filed on Dec. 27, 2022, in the Korean Intellectual Property Office, the entire disclosure of which is incorporated herein by reference for all purposes.

BACKGROUND

1. Field

The following description relates to a method and apparatus with unified virtual memory (UVM) management.

2. Description of Related Art

UVM technology may provide a single unified address space to multiple processing devices such as a central processing unit (CPU) and a graphic processing unit (GPU). A processing device such as a GPU may process deep neural network (DNN) models. For example, a GPU used to process DNN models that require more memory than may be available or provided by the physical memory of the GPU by employing a virtual address space of the UVM. A UVM may be utilized to provide a large address space. For example, with such a large address space being available to the GPU for DNN processing, a user can use the system without being directly concerned about underlying complex processes such as data movement between multiple processing devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implement method including updating memory allocation information of a unified virtual memory (UVM) based on block information of model data blocks used for an execution of a deep learning model by a deep learning framework, and performing a least recently used (LRU) eviction based on the updated memory allocation information.

The block information may include one or more of a portion of a liveness, size, address, and type of the model data blocks.

The updating of the memory allocation information may include, in response to a first model data block of the model data blocks corresponding to a weight parameter of the deep learning model, assigning a lowest priority value as an eviction target for the LRU eviction to a first UVM data block of the UVM corresponding to the first model data block.

The assigning of the lowest priority value to the first UVM data block may include assigning a negative liveness value to the first UVM data block.

The updating of the memory allocation information may include, in response to a second model data block of the model data blocks being newly allocated after a free operation on a previous model data block, initializing a liveness of a second UVM data block of the UVM corresponding to the second model data block.

The performing of the LRU eviction may include performing the LRU eviction according to an occurrence of graphic processing unit (GPU) oversubscription.

The performing of the LRU eviction may include, in response to a third UVM data block corresponding to an eviction target being matched to a third model data block having a greater size than the third UVM data block, performing eviction on a block group of the UVM matched to the third model data block.

The method may include reflecting of the block information, by an extended unified memory (EUM) runtime and EUM driver provided separately from a UVM runtime and UVM driver of the UVM.

The LRU eviction may be performed based on an LRU list managed through the UVM driver, and at least part of a liveness of each UVM data block in the LRU list is adjusted based on the block information.

The EUM driver may specify a first liveness value of a first model data block of the model data blocks based on the block information, and the first liveness value may be reflected in the LRU list.

In a general aspect, here is provided an electronic device including a processor configured to execute instructions and a memory storing the instructions, the execution of the instructions configures the processor to collect block information on model data blocks used for an execution of a deep learning model by a deep learning framework, update memory allocation information of a unified virtual memory (UVM) based on the collected block information, and perform a least recently used (LRU) eviction based on the updated memory allocation information.

The block information may include one or more of a portion of a liveness, size, address, and type of the model data blocks.

For the updating of the memory allocation information, the processor may be configured to, in response to a first model data block of the model data blocks corresponding to a weight parameter of the deep learning model, assigning a lowest priority value as an eviction target for the LRU eviction to a first UVM data block of the UVM corresponding to the first model data block.

For the assigning of the lowest priority to the first UVM data block, the processor may be configured to assign a negative liveness to the first UVM data block.

For the updating of the memory allocation information, the processor may be configured to, in response to a second model data block of the model data blocks being newly allocated after a free operation on a previous model data block, initialize a liveness of a second UVM data block of the UVM corresponding to the second model data block.

For the performing of the LRU eviction, the processor may be configured to, in response to a third UVM data block corresponding to an eviction target being matched to a third model data block having a greater size than the third UVM data block, perform an eviction on a block group of the UVM matched to the third model data block.

The operations may include reflecting the block information, the collecting and the reflecting of the block information are performed by an extended unified memory (EUM) runtime and EUM driver provided separately from a UVM runtime and UVM driver of the UVM.

The LRU eviction may be performed based on an LRU list managed through the UVM driver, and at least part of a liveness of each UVM data block in the LRU list may be adjusted based on the collected block information.

The EUM driver may specify a first liveness value of a first model data block of the model data blocks based on the collected block information, and the first liveness value may be reflected in the LRU list.

In a general aspect, here is provided a processor-implemented method using a unified verification memory (UVM) that provides a single address space of physical memory of a graphics processing unit (GPU) and physical memory, exterior of the GPU, including executing model data blocks of a neural network using the GPU and the UVM, including providing virtual addresses to physical memory of, and exterior to, a physical memory, assigning a low eviction value, of eviction values for a plurality of OVM data blocks that are weight values of the neural network, to a UVM data block of the plurality of UVM data blocks, and performing a least recently used (LRU) eviction policy, responsive to a detection of an oversubscription, based on the eviction values.

The method may include grouping two or more UVM data blocks of the plurality of UVM data blocks according to a combined size of the two or more UVM data blocks with respect to a matched model data block, and the performing of the LRU eviction policy may include evicting the two or more UVM data blocks according to an eviction value of the two or more UVM data blocks.

The method may further include reflecting block information of a newly allocated model data block to a related UVM data block and assigning a high eviction value to the related UVM data block.

Other features and aspects will be apparent from the following detailed description, the drawings, and the claims.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Figure 1:
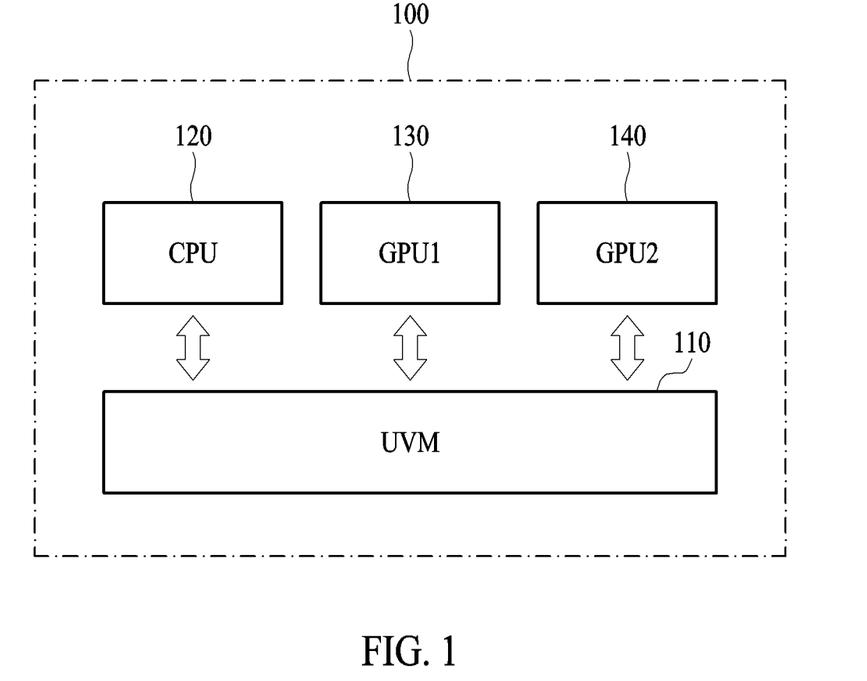
FIG. 1 illustrates an example connection structure of multiple processing devices and a unified virtual memory (UVM) according to one or more embodiments.

FIG. 1 illustrates an example connection structure of multiple processing devices (e.g., different processing device circuitries and/or circuit portions of a larger circuit) and a unified virtual memory (UVM) according to one or more embodiments. Referring to FIG. 1, a computing device 100 may include a unified virtual memory (UVM) 110 that may provide a single address space to multiple processors of different processing devices, such as a central processing unit (CPU) 120, a first graphic processing unit (GPU) 130, and a second GPU 140. The following description of GPUs may also be applied to further types of the processing devices, such as a neural processing unit (NPU). A virtual address space sharing different physical memories such as the physical memory of the CPU 120 and the physical memory of the first GPU 130 may be provided by the UVM 110. An operation of a machine learning model, such as a deep neural network (DNN) model, that may use more memory (e.g., due to the number of parameters) than any one physical memory (e.g., the physical memory of the first GPU 130) may be able to provide or make available, while such memory use or requirements may be realized by the UVM 110. In practice, a user can use the system where the UVM 110, as a memory, provides a large address space, and the user may thus be provided with the convenience of not having to be directly concerned about complex processes such as data movement between different processors (e.g., the CPU 120 and the first GPU 130).

In an example, when the DNN model is trained in the UVM 110, training may be performed without separate division work such as parallel distributed training using separate computing devices. In addition, the UVM 110 may provide improved scalability. Whenever a new DNN model appears, no effort may be required to partition a physical memory for the machine learning model (e.g., the DNN model). For framework-based distributed technology, a multi-GPU environment may be utilized. The UVM 110 may provide an environment suitable for performing the machine learning model training on a single server by providing a very large virtual space including a CPU's physical memory even when operating in a single GPU environment. In addition, the UVM 110 may provide excellent usability. The UVM 110 may be available for operations of all applications using the UVM 110 as well as the learning of the machine learning model.

Figure 2:
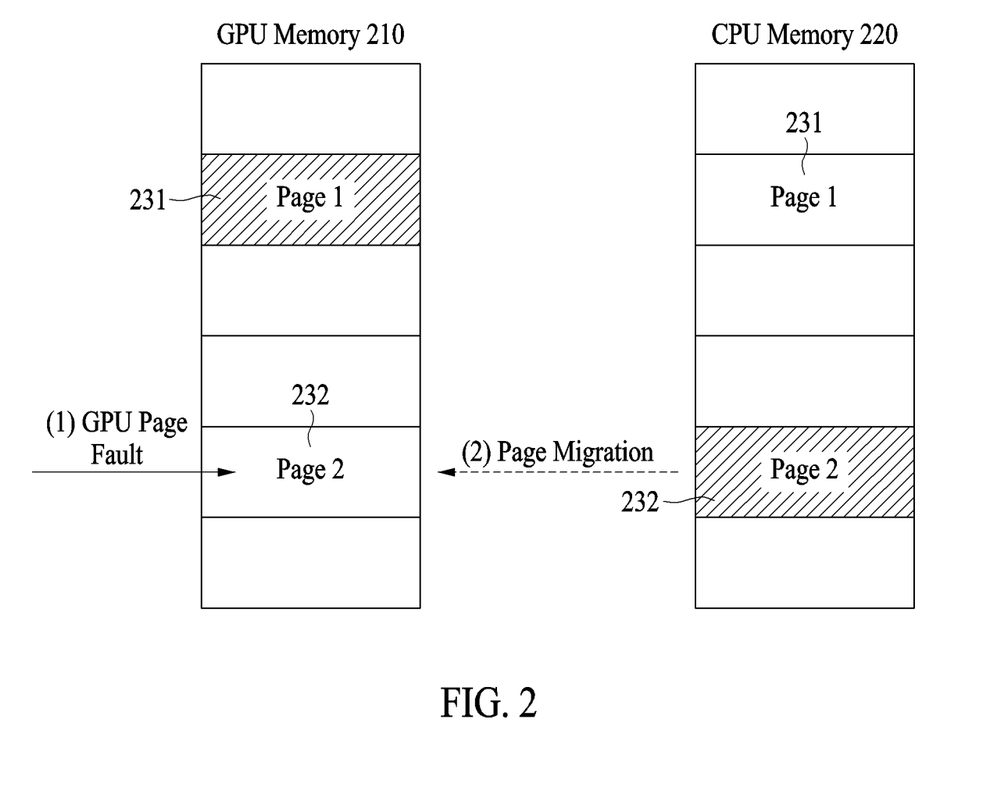
FIG. 2 illustrates an example page migration according to a page fault according to one or more embodiments.

FIG. 2 illustrates an example page migration according to a page fault according to one or more embodiments. In a non-limiting example, a UVM may perform page access through on-demand paging in response to a fault. For example, a page 1 231 may be stored in a GPU memory 210, a page 2 232 may be stored in a CPU memory 220, and the GPU and the CPU may use the page 1 231 and the page 2 232 through the UVM. The GPU memory 210 and the CPU memory 220 may correspond to a physical memory and make up a UVM. When the GPU performs page access to the GPU memory 210 to obtain the page 2 232, a fault may occur if the page 2 232 does not exist in the GPU memory 210. In this example, where the fault has occurred, the page 2 232 may be transferred from the CPU memory 220 having the page 2 232 to the GPU memory 210 through page migration.

In an example, GPU hardware and CPU software may communicate with each other to perform the fault and migration process. A fault-based operation may allow for the flexible handling of various situations. However, a fault-based task may proceed through a complex internal operation process of the UVM. Since the series of operations cause continuous communication between hardware and software, there may be a significant performance overhead costs associated with the fault-based task approach.

In an example, the UVM may have performance limitations due to its fault-based approach. Communication between the CPU and the GPU may be performed through a peripheral component interconnect express (PCIe) component. The PCIe may have a very slow physical speed compared to high bandwidth memory (HBM). As a result, significant slowdowns may occur when pages are migrated between the CPU and GPU. Fault handling itself may also have a large overhead. Fault handling approaches may require complex processes to be performed and may also use or require continuous communication between the GPU hardware and CPU software.

In an example, the degradation in performance may be even greater when GPU oversubscription occurs. In an example, GPU oversubscription may occur in a situation where a working set of a program is greater than the GPU memory 210. In the UVM, the GPU may select and migrate a portion of originally populated data blocks to the CPU memory 220 in order to secure physical memory space. GPU oversubscription may incur additional fault handling overhead and data migration costs and may cause significant performance degradation. Huge DNN models may have very large working set sizes, which may lead to GPU oversubscription of the UVM.

Figure 3:
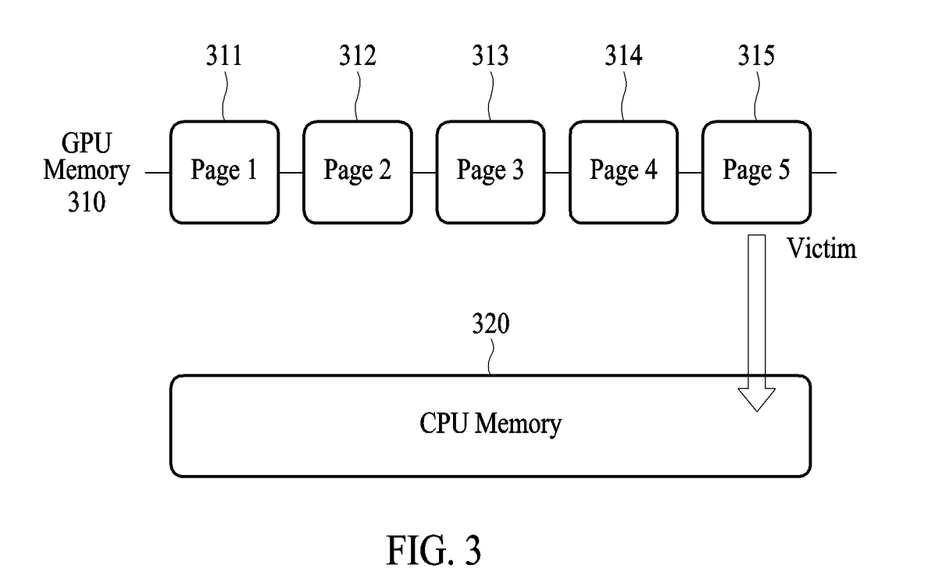
FIG. 3 illustrates an example least recently used (LRU) eviction policy according to one or more embodiments.

FIG. 3 illustrates an example least recently used (LRU) eviction policy according to one or more embodiments. When GPU oversubscription occurs, an LRU eviction policy may be performed to secure a physical memory space of the GPU in a UVM. Referring to FIG. 3, a page 1 311, a page 2 312, a page 3 313, a page 4 314, and a page 5 315 may be populated in a GPU memory 310.

In a non-limiting example, to operate the LRU eviction policy in the UVM, an LRU list may be managed based on a fault. The page 1 311, the page 2 312, the page 3 313, the page 4 314, and the page 5 315 may be listed in the LRU list in an order in which the pages were populated in the GPU memory 310 after a fault occurs. FIG. 3 illustrates an example in which the population period (i.e., the least recently used) of the page 5 315 is the longest and the population period of the page 1 311 is the shortest. According to the LRU eviction policy, the page 5 315 having the longest population period may be evicted. An eviction target such as the page 5 315 may be referred to as a "victim." A data block to which the page 5 315 belongs may be migrated to a CPU memory 320. For example, a size of the page 5 315 may be 64 KB, and a size of the data block may be 2 MB. In this example, a space of 2 MB may be secured in the GPU memory 310 through the migration. When the program runs out of the additional 2 MB of space, the LRU eviction policy may be triggered again.

In an example, a UVM LRU eviction policy may operate without considering the characteristics of a DNN model. During a training process of the DNN model, an operation of the GPU memory 310 may exhibit very stable, repeatable, and predictable operating characteristics. The process of learning for the DNN model may be one aimed towards minimizing loss to a target. The DNN model may have a fixed number of layers, a fixed number of learning parameters, and the like. In the learning process, the same task may be performed iteratively to improve the accuracy of the model by incrementally adjusting learning parameters, for example. In the learning process, memory characteristics such as the number of memory blocks generated in the learning process, an order in which the blocks are generated, and a life cycle of the blocks may be the same. For example, because predetermined pages of the DNN model that are frequently used in the GPU are highly likely to be continuously used during the learning, it may be advantageous for the pages to reside in the GPU memory 310 when possible. In an example, when the GPU accesses a predetermined page (i.e., a frequently used page), an operation of moving a most recently used (MRU) position in the LRU list may be performed so that the corresponding page is not selected as an eviction target. Keeping the frequently used pages from being evicted may reduce migration costs and improve performance.

In an additional example, in the UVM LRU eviction policy, communication between the management of data blocks of the UVM and management of data blocks of a deep learning framework (e.g., a Pytorch framework) may not take place. In the deep learning framework, independent memory management techniques may exist for solving issues such as memory fragmentation. In an example, the UVM may also use these independent memory management techniques. Each memory management technique may exist in one system, but a situation in which the characteristics of each other's data blocks are not shared may occur. For example, when the LRU eviction policy is performed in the UVM, the policy may be determined only from the perspective of the memory managed by the UVM side, and information on the data blocks managed by the deep learning framework side may not be checked. The performance of the LRU eviction policy of the UVM may be improved when the deep learning framework provides information on a predetermined page to the UVM and the UVM uses it.

In an example, the LRU eviction policy of the UVM may be improved through communication between the UVM and the deep learning framework. The learning speed of the DNN model may be improved by minimizing unnecessary data migration according to the correct selection of the eviction target and by minimizing fault handling overhead according to an increase in hit rate.

Figure 4:
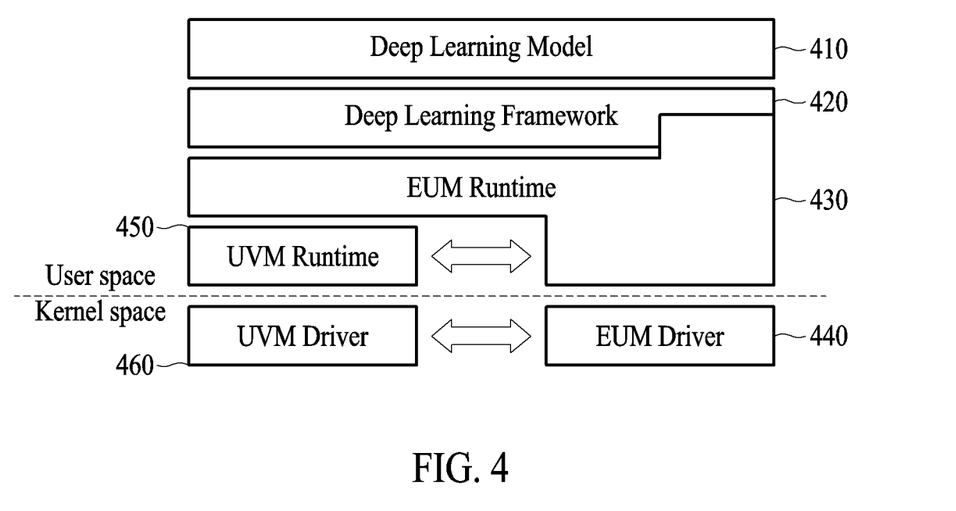
FIG. 4 illustrates an example layered structure of a kernel space and a user space to which an extended unified memory (EUM) runtime and an EUM driver are added according to one or more embodiments.

FIG. 4 illustrates an example layered structure of a kernel space and a user space to which an extended unified memory (EUM) runtime and an EUM driver are added according to one or more embodiments.

In a non-limiting example of a structure (e.g., the computing apparatus 100 of FIG. 1), a UVM driver 460 may operate in the kernel space, and a UVM runtime 450, a deep learning framework 420, and a deep learning model 410 may operate in the user space. In an example, an extended unified memory (EUM) runtime 430 may be added to the user space, and an EUM driver 440 may be added to the kernel space. The EUM runtime 430 may be connected to the deep learning framework 420 to collect and manage information on data blocks of the deep learning framework 420. The EUM runtime 430 may communicate with the EUM driver 440 about data blocks under its management. The EUM driver 440 may oversee policies regarding LRU eviction. The EUM runtime 430 and the EUM driver 440 may call desired functions through mutual communication with the UVM runtime 450 and the UVM driver 460. As a structure in which the EUM runtime 430 and the EUM driver 440 are newly added is used, modification of typical software may be minimized. This structure may be applied to various UVM software stacks and may provide compatibility and scalability.

In a typical structure, the UVM runtime 450 and the UVM driver 460 of the UVM side and the deep learning framework 420 may manage data blocks independently of each other. Accordingly, a discrepancy between the UVM and the deep learning framework 420 in terms of the size of the data blocks, liveness information, and the like may occur. A data block of the UVM and a data block of the deep learning framework 420 may be referred to as a UVM data block and a model data block for convenience.

When a GPU oversubscription occurs, the UVM may migrate the oldest accessed UVM data block to CPU memory according to a typical LRU eviction policy. Since the UVM performs the LRU eviction policy for the UVM data block based on a memory structure that is managed independently, the characteristics of a model data block managed by the deep learning framework 420 may not be considered. Therefore, when memory allocation information managed by the deep learning framework 420 is provided to the UVM side, the policy may be performed in a more accurate and efficient manner when the UVM data block is evicted. Information on the model data blocks of the deep learning framework 420 may be provided through a communication channel between the EUM runtime 430 and the UVM runtime 450 and/or a communication channel between the EUM driver 440 and the UVM driver 460.

In an example, the EUM runtime 430 may collect block information on model data blocks used for execution of the deep learning model 410 by the deep learning framework 420. The UVM driver 460 may update the memory allocation information of the UVM based on the collected block information and perform LRU eviction based on the updated memory allocation information. The EUM runtime 430 may transfer the block information to the EUM driver 440, and the block information of the model data blocks may be reflected in the UVM data blocks through a communication between the EUM driver 440 and the UVM driver 460.

The block information of the model data blocks may include at least a portion of a liveness, size, address, and type information. The liveness information may be an elapsed time after the population of a predetermined data block begins. The liveness of a data block (e.g., the elapsed time since population begins) may increase over time. The size information may be a size of a memory space occupied by a predetermined data block. The address information may be an address of a memory space to which a predetermined data block is allocated. The size may be specified through the address. The type information may be a role of a predetermined data block for the execution of the deep learning model 410. For example, the type (i.e., role of the data) may include input data, output data, network parameters (e.g., weight data), and temporary data.

In an example, the block information of the model data blocks may affect the memory allocation information for the UVM data blocks. For example, the liveness of the UVM data block may be adjusted according to the type of the model data block. In addition, the liveness of the model data block may be reflected in the liveness of the UVM data block corresponding to the model data block, according to an allocation state of the model data block. In addition, according to the size of the model data block, the UVM data blocks corresponding to the corresponding model data block may be grouped and operated.

More specifically, in an example, weight parameters may be given a priority value. In an example, a high priority value may be given to a UVM data block corresponding to a weight parameter of the DNN model, and the corresponding UVM data block may reside in the GPU memory for as long as possible. Accordingly, the GPU memory may be efficiently used.

Recently, transformer-based models have become widely used in the field of artificial intelligence (AI). In order to reduce the learning time of models including transformers, a bit precision of weight parameters may be temporarily lowered during the learning optimization process. For example, a 32-bit floating point (FP) representation may be temporarily lowered to a 16-bit FP representation. In this example, a 32-bit FP representation and a 16-bit FP representation may coexist in a memory space. Accordingly, in this example, a GPU memory space may be further used to improve learning speed.

In an example, the weight parameters of the DNN model may be used in forward state, backward state, and optimization state. The weight parameters may correspond to one of the most reused data blocks in the DNN model. Since the data block is reused the most, when the probability of being selected as an eviction target is reduced by giving the lowest priority in the LRU eviction policy, the probability of residing in the GPU for a long time may be increased. Since the data block having strong reusability resides in the GPU memory for a long time, the hit rate may increase, and thereby reduce unnecessary migration and fault handling overhead, thereby improving performance.

In an example, an allocated block synchronization may be performed. Whenever a new model data block is allocated through the deep learning framework 420, information on each model data block may be reflected in the UVM data block. For example, when a new model data block is allocated, the liveness of a UVM data block corresponding to the new model data block may be initialized. Accordingly, in this example, the LRU eviction policy may be efficiently managed. When the new model data block is allocated in the deep learning framework 420, the liveness of UVM data blocks matching the corresponding model data block may be collectively updated. Accordingly, the probability of the UVM data block corresponding to the new model data block of the deep learning framework 420 being selected as an eviction target by the UVM LRU eviction policy may be reduced. On the other hand, in a typical method, because the information of the model data block that is newly allocated in the deep learning framework 420 is not delivered to the UVM side, the typical LRU eviction policy may not operate correctly.

For example, after a model data block managed by the deep learning framework 420 is in a free state, a new model data block may be allocated to the corresponding space. When a free operation is executed, the model data block, according to the free operation, may enter a memory pool which may be managed as a free list in the deep learning framework 420. Then, when an allocation of a new model data block is requested, the model data block in the free list may be reallocated as a new model data block. On the other hand, in the typical method, in the aspect of the UVM, it may be difficult to identify the history that the corresponding model data block was reallocated after being in a free state in the deep learning framework 420. Therefore, according to the typical method, the UVM data block corresponding to the corresponding model data block of the deep learning framework 420 may be mistakenly recognized as being continuously allocated without considering the free state and reallocation. Therefore, such history may not be reflected in the LRU list, and the newly allocated model data block in the deep learning framework 520 may be mistakenly recognized as a page generated a long time ago, and the UVM data block corresponding to the new model data block may be selected as an eviction target. Accordingly, performance degradation may occur due to the wrong selection of the eviction target.

In an example, whenever a model data block is newly allocated to the deep learning framework 420, allocation information may be provided to the UVM side, and the UVM driver 460 may update the status of the UVM data block and the UVM LRU list. Accordingly, GPU memory performance may be improved by reducing the probability of the corresponding UVM data block being selected as an eviction target by the LRU eviction policy and keeping the corresponding UVM data block in the GPU for as long as possible.

In an example, migration may be performed by grouping UVM data blocks according to the size of model data blocks. In an example, the size information of each model data block may be delivered to the UVM side, and when a UVM data block is evicted by the LRU eviction policy, other UVM data blocks belonging to the same group as the corresponding UVM data block may be evicted together. In this process, physical memory space may be efficiently used by removing unnecessary UVM data blocks. A model data block may have a much greater size than a UVM data block. In a non-limiting example, the size of a model data block may be as small as 512 KB and as large as GB units. In another example, a unit of a UVM data block may be fixed as 2 MB. An effective range of data may be evicted by considering the sizes of two different data blocks.

When GPU oversubscription occurs, a typical policy may allow the UVM data block of 2 MB to be evicted and new data to be migrated to the GPU memory space. Nevertheless, when the GPU memory space is insufficient, such series of processes including eviction and migration may be performed repeatedly. This typical process may cause a large overhead due to continuous communication between hardware and software. When the grouping of UVM data blocks, according to an example, is used, the size of model data blocks may be provided to the UVM driver 460. Since the group of UVM data blocks corresponding to the model data block may be migrated as a whole at the time of initial eviction, unnecessarily repetitive eviction operations may be omitted, and performance may be improved as the bandwidth increases through continuous data migration.

Figure 5:
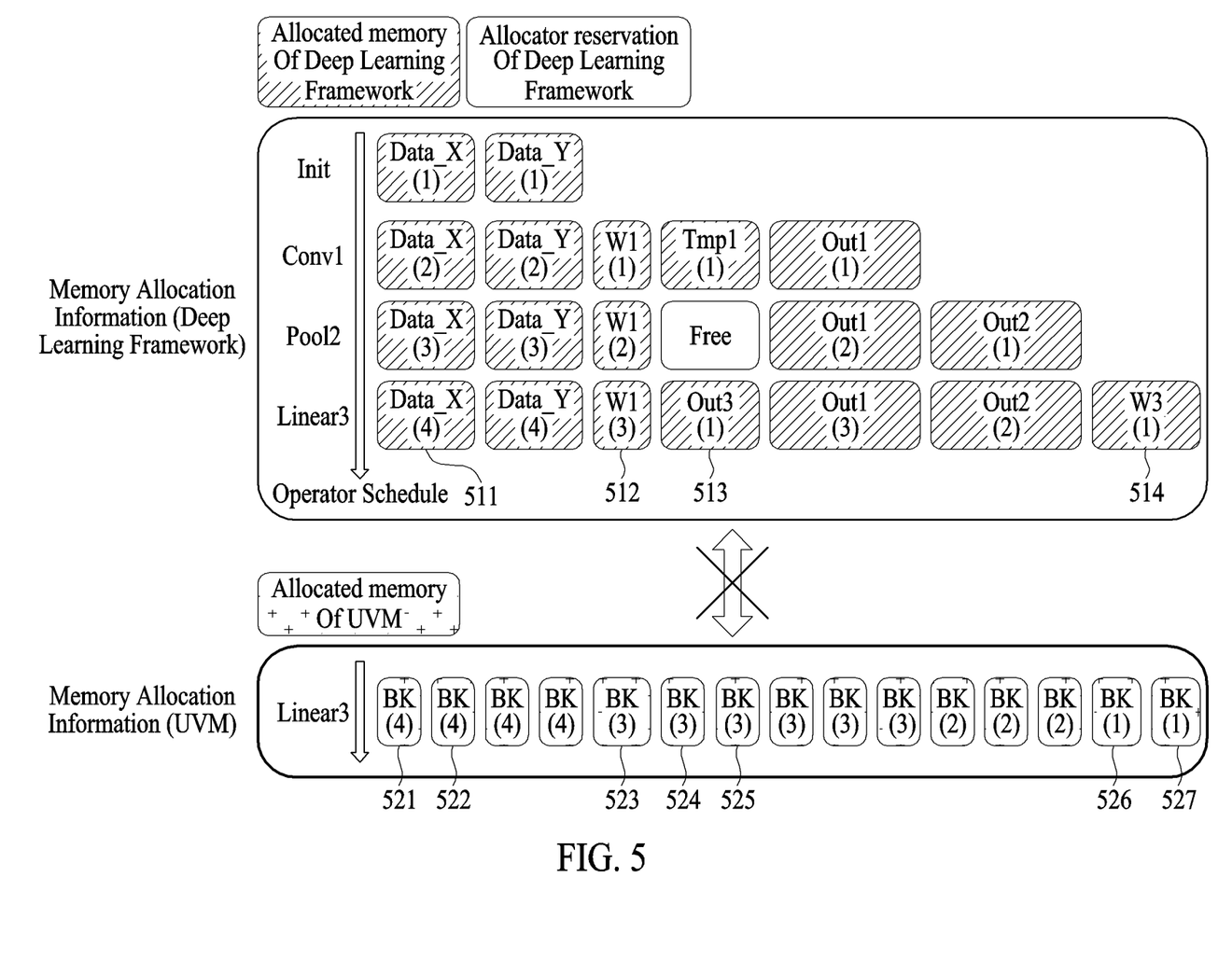
FIG. 5 illustrates an example memory allocation state of a deep learning framework and a UVM according to one or more embodiments.

FIG. 5 illustrates an example memory allocation state of a deep learning framework and a UVM according to one or more embodiments. Referring to FIG. 5, when a DNN model is being trained through a deep learning framework in a UVM environment, various data blocks may be allocated. In FIG. 5, a vertical axis may represent an operation schedule or time, and a horizontal axis may represent the size of a data block. In FIG. 5, an upper area may represent data allocation information of the deep learning framework, and a lower area may represent data allocation information of the UVM.

Referring to the upper area, model data blocks of an initialization layer Init, a convolution layer Conv1, a pooling layer Pool2, and a linear operation layer Linear3 may be allocated. In a non-limiting example, the model data blocks may include input data Data_X and Data_Y, weight data W1 and W3, temporary data Temp1, and output data Out1, Out2, and Out3. The numbers in parentheses of each data block may represent liveness. For example, when a data block is initially allocated, liveness may be initialized to 1, and may increase according to the progress of an operation schedule.

The lower area may represent UVM memory allocation information at the time when the operation of the linear operation layer Linear3 is completed. An LRU list may be determined according to the UVM memory allocation information. An LRU eviction policy may be performed in an order of least recently used according to the LRU list. According to the typical LRU management policy, the LRU list may be updated when the population of a data block occurs due to a fault. When GPU oversubscription occurs, the data block with the longest population period may be evicted. In the example of FIG. 5, one of the UVM data blocks having a liveness of 4 (e.g., a UVM data block 521) may be selected as an eviction target (i.e., the victim).

In a comparison between the model data blocks and the UVM data blocks, it may be confirmed that block information of the model data blocks is not reflected in the UVM data blocks. According to the method of FIG. 5, the UVM may not identify the block information of the deep learning framework and may not be aware of the generation and destruction of the model data blocks by the deep learning framework. For example, high liveness may be allocated to UVM data blocks 524 and 525 corresponding to a newly allocated model data block 513 after a free operation. In addition, appropriate measures may not be taken for UVM data blocks 523, 526, and 527 according to model data blocks 512 and 514 corresponding to the weight parameters. In addition, in a state in which a plurality of UVM data blocks 521 and 522 are matched to a single model data block 511, unified management of the plurality of UVM data blocks 521 and 522 may not be performed. According to the typical method, a correct LRU policy may not be performed.

Figure 6:
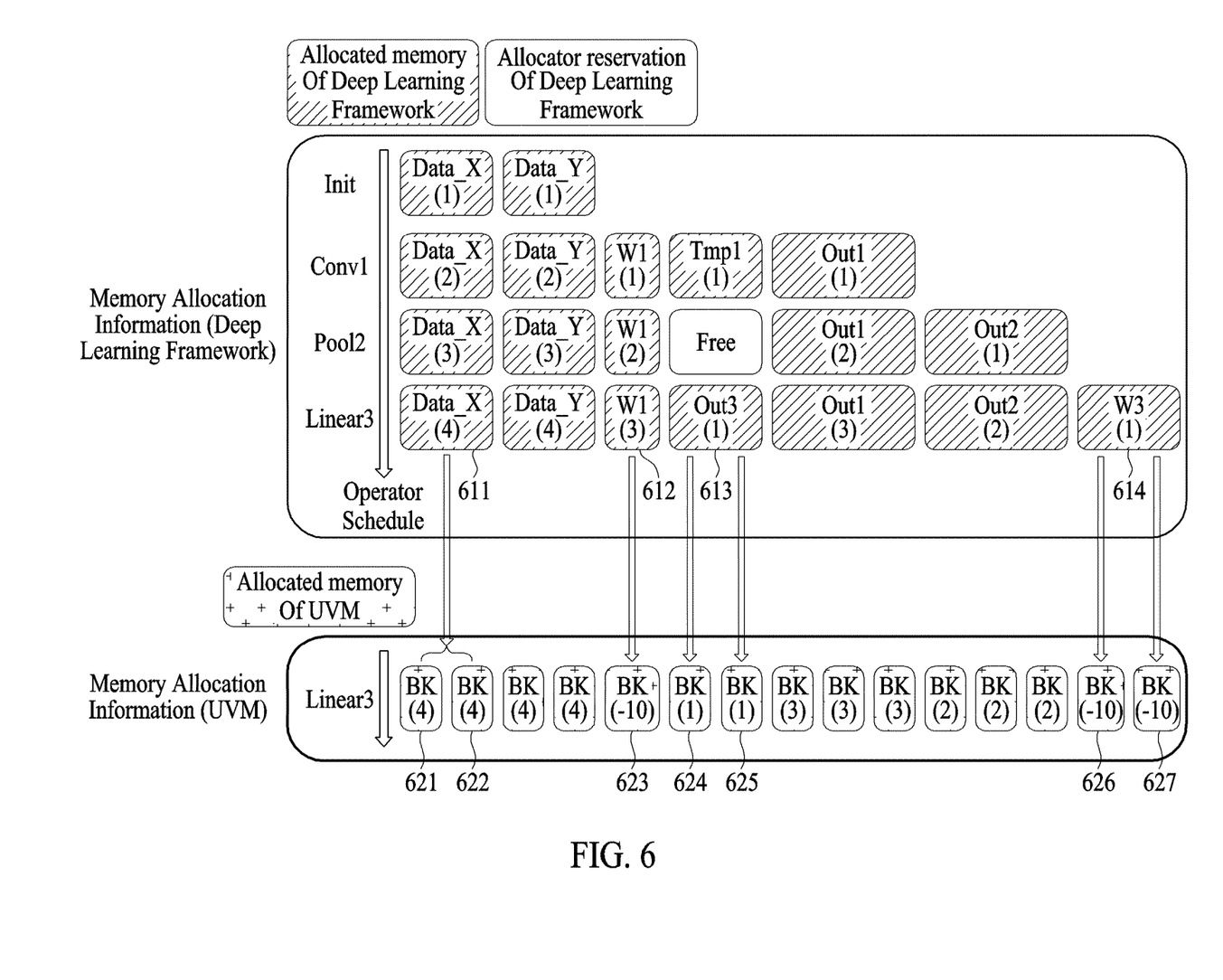
FIG. 6 illustrates an example memory allocation state of a deep learning framework and a UVM according to one or more embodiments.

FIG. 6 illustrates an example memory allocation state of a deep learning framework and a UVM, according to one or more embodiments. In an example, memory allocation information of the deep learning framework may be reflected in UVM memory allocation information, and in this process, several operations as follows may be performed.

In a first example, a prioritization of weight parameters may be performed. Since the weight parameters of a DNN model are highly likely to be reused in the GPU, long-term population in the GPU may be advantageous for GPU memory usage. Therefore, the lowest priority as an LRU eviction target may be given to the UVM data block corresponding to the weight parameters. For example, a negative liveness may be given to the corresponding UVM data block. In the example of FIG. 6, a liveness of −10 may be given to UVM data blocks 623, 626, and 627 corresponding to model data blocks 613 and 614 of weight parameters W1 and W3. Accordingly, when the LRU eviction policy is performed, the UVM data blocks 623, 626, and 627 corresponding to the weight parameters W1 and W3 may be evicted last.

In a second example, an allocated block synchronization operation may be performed. Whenever a model data block is newly allocated in the deep learning framework, information on the new allocation of the corresponding model data block may be reflected in the UVM data block. The newly allocated data block may have a high probability of having temporal locality. Temporal locality may be a tendency to re-access a recently accessed address. In FIG. 6, since the model data block 613 for output data Out3 is newly allocated, the liveness of UVM data blocks 624 and 625 corresponding to the model data block 613 may be initialized to 1. On the other hand, in the example of FIG. 5, where the model data block 513 is newly allocated after a free operation, as there is no sharing of information related to the new allocation, the liveness of the UVM data blocks 524 and 525 may be set to 3, and thus an incorrect LRU policy may be performed.

In a third example, a grouping of UVM data blocks according to the size of model data blocks may be performed. The size and/or address of each model data block may be reflected in the memory allocation information of the UVM data blocks. A model data block 611 may have a greater size than a UVM data block 621, and a plurality of UVM data blocks 621 and 622 may be matched to the model data block 611. Here, the UVM data blocks 621 and 622 matched to the model data block 611 may be managed as one group. For example, when the LRU eviction policy is implemented, the UVM data blocks 621 and 622 belonging to the same group may be evicted as a whole. When a UVM data block is evicted, the model data block connected to the corresponding UVM data block may not be used for the time being. Accordingly, advantages such as securing additional GPU memory space and reducing overhead in the selection process of the eviction policy may occur according to the operation of the policy as described above.

Figure 7:
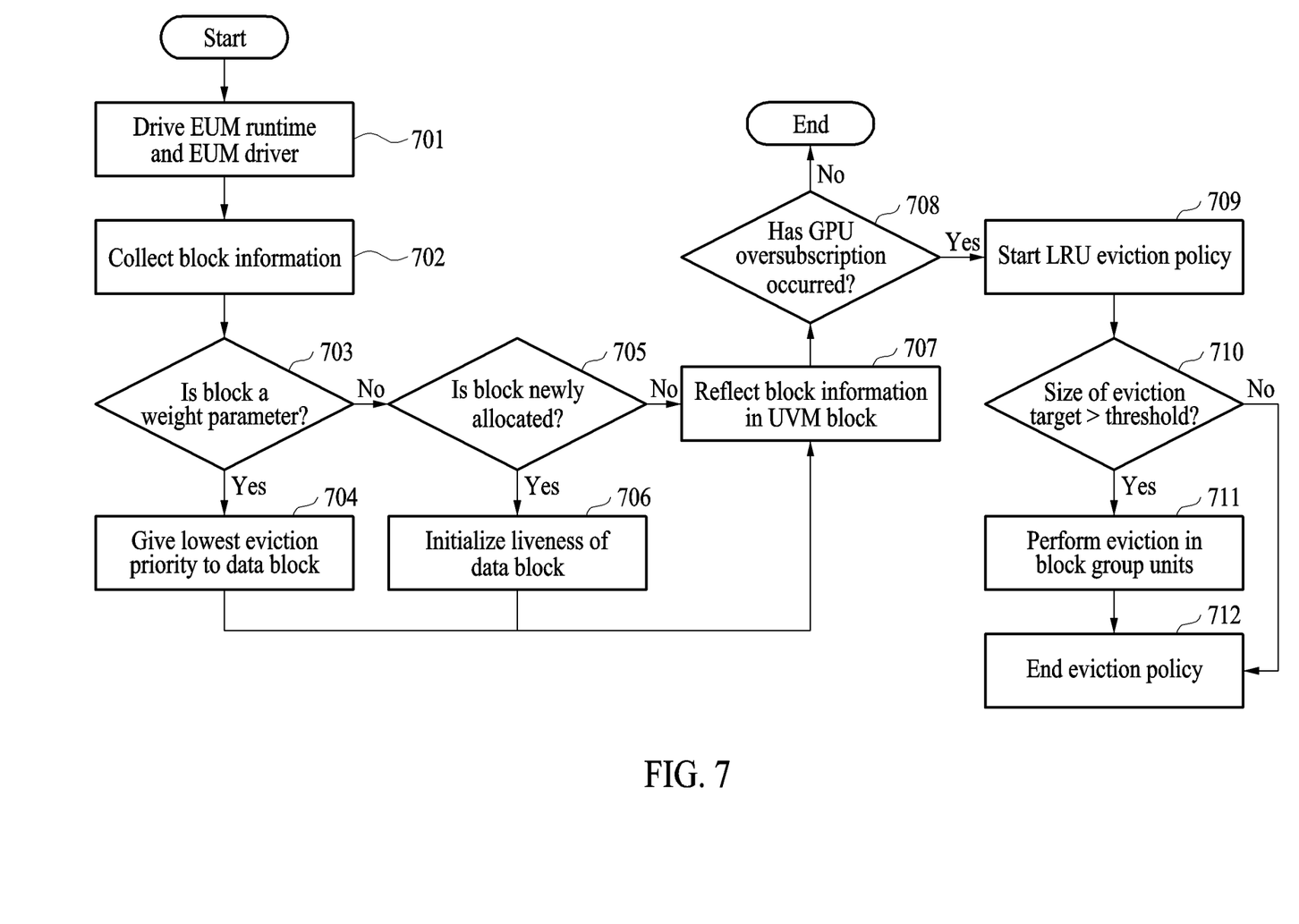
FIG. 7 illustrates an example method according to one or more embodiments.

FIG. 7 illustrates an example method, according to one or more embodiments. Referring to FIG. 7, in a non-limiting example, an EUM runtime and EUM driver may be driven in operation 701, and block information may be collected in operation 702. The EUM runtime may collect block information of model data blocks of a deep learning framework and deliver the block information to the EUM driver.

In operation 703, it may be determined whether the model data block corresponds to a weight parameter. When the model data block corresponds to the weight parameter, in operation 704, it may be determined to give the lowest eviction priority to a UVM data block corresponding to the model data block. In operation 705, after it is determined in operation 703 that the model data block does not correspond to a weight parameter, it may be determined whether the model data block is newly allocated. When it is determined that the model data block is newly allocated, in operation 706, it may be determined to initialize liveness of the UVM data block corresponding to the corresponding model data block.

In operation 707, after it is determined that the block is not newly allocated in operation 705, the block information may be reflected in the UVM data block. The determinations made in operations 704 and 706 may be reflected in the UVM data block for operation 707. For example, the lowest eviction priority may be given to the UVM data block corresponding to the weight parameter, and the liveness of the UVM data block corresponding to the newly allocated model data block may be initialized. Operations 703 to 707 may be performed by the EUM driver and/or a UVM driver. In an example, the UVM driver may manage an LRU list. The EUM driver may adjust at least part of the liveness of each UVM data block in the LRU list based on the collected block information. For example, a first liveness value of a first model data block of the model data blocks may be specified based on the collected block information, and the first liveness value may be reflected in the LRU list. For example, the first liveness value may be a negative liveness value such as −10 or an initial value such as 1. The first liveness value may be reflected in the LRU list by the UVM driver.

In operation 708, it may be checked whether a GPU oversubscription has occurred. When GPU oversubscription has occurred, an LRU eviction policy may be started in operation 709. In operation 710, it may be determined whether the size of an eviction target is greater than a threshold. The threshold may correspond to the size of the UVM data block. When the size of the eviction target is greater than the threshold, an eviction in block group units may be performed in operation 711. When a UVM data block is evicted, UVM data blocks of a block group to which the corresponding UVM block belongs may be evicted together. In operation 712, the eviction policy may end. Operations 709 to 712 may be performed by the UVM driver.

Figure 8:
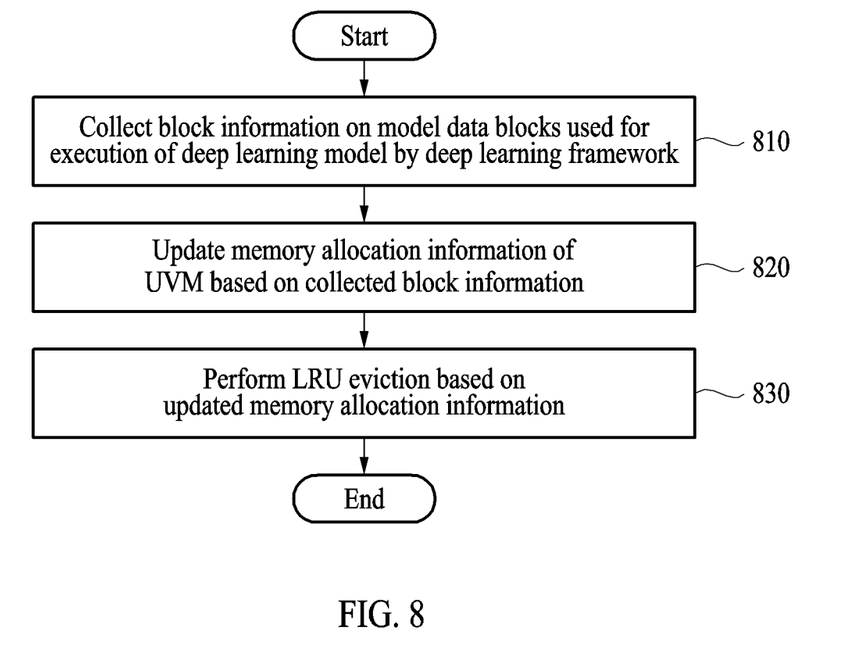
FIG. 8 illustrates an example method according to one or more embodiments.

FIG. 8 illustrates an example UVM management method, according to one or more embodiments. Referring to FIG. 8, in a non-limiting example, an electronic device may collect block information on model data blocks used for an execution of a deep learning model by a deep learning framework in operation 810, update memory allocation information of a UVM based on the collected block information in operation 820, and perform LRU eviction based on the updated memory allocation information in operation 830.

In a non-limiting example, the block information may include at least a portion of a liveness, size, address, and type of the model data blocks.

In operation 820, when a first model data block of the model data blocks corresponds to a weight parameter of the deep learning model, the lowest priority as an eviction target for LRU eviction may be given to a first UVM data block of the UVM corresponding to the first model data block. Giving the lowest priority to the first UVM data block may include giving a negative liveness to the first UVM data block.

In operation 820, in an example, when a second model data block of the model data blocks is newly allocated after a free operation on a previous model data block, a liveness of a second UVM data block of the UVM corresponding to the second model data block may be initialized.

Operation 830 may include performing LRU eviction according to an occurrence of a GPU oversubscription.

In operation 830, in an example, when a third UVM data block corresponding to an eviction target is matched to a third model data block having a greater size than the third UVM data block, an eviction may be performed on a block group of the UVM matched to the third model data block. The block group may include a plurality of UVM data blocks including the third UVM data block.

In a non-limiting example, the collecting and reflecting of the block information may be performed by an EUM runtime and EUM driver provided separately from a UVM runtime and UVM driver of the UVM. The LRU eviction may be performed based on an LRU list managed through the UVM driver, and at least part of the liveness of each UVM data block in the LRU list may be adjusted based on the collected block information. The EUM driver may specify a first liveness value of the first model data block of the model data blocks based on the collected block information, and the first liveness value may be reflected in the LRU list.

In addition, the description provided above and below with reference to FIGS. 1 to 7, 9, and 10 may apply to the UVM management method of FIG. 8.

Figure 9:
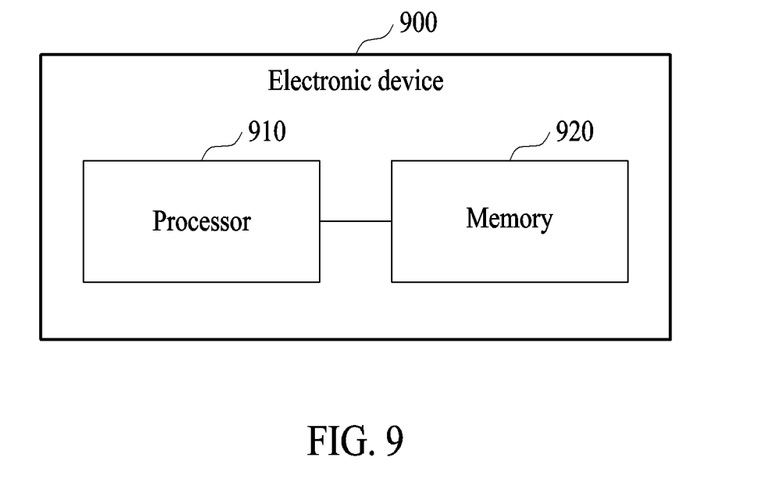
FIG. 9 illustrates an example electronic device according to one or more embodiments.

FIG. 9 illustrates an example electronic device, according to one or more embodiments. Referring to FIG. 9, in a non-limiting example, an electronic device 900 may include a processor 910 and a memory 920. The memory 920 may include computer-readable instructions. The processor 910 may be configured to execute computer-readable instructions, such as those stored in the memory 920, and through execution of the computer-readable instructions, the processor 910 is configured to perform one or more, or any combination, of the operations and/or methods described herein. The memory 930 may be a volatile or nonvolatile memory.

The processor 910 may be configured to execute programs or applications to configure the processor 910 to control the electronic apparatus 900 to perform one or more or all operations and/or methods described above with reference to FIGS. 1 to 8, and 10, and may include any one or a combination of two or more of, for example, a central processing unit (CPU), a graphic processing unit (GPU), a neural processing unit (NPU) and tensor processing units (TPUs), but is not limited to the above-described examples. The processor 910 may implement at least part of a deep learning framework, an EUM runtime, an EUM driver, a UVM runtime, and a UVM driver. The memory 920 may form a UVM together with a GPU memory or NPU memory. In addition, the description provided with reference to FIGS. 1 to 8 and 10 may apply to the electronic device 900.

For example, the processor 910 may collect block information on model data blocks used for execution of a deep learning model by a deep learning framework, update memory allocation information of a UVM based on the collected block information, and perform LRU eviction based on the updated memory allocation information.

Figure 10:
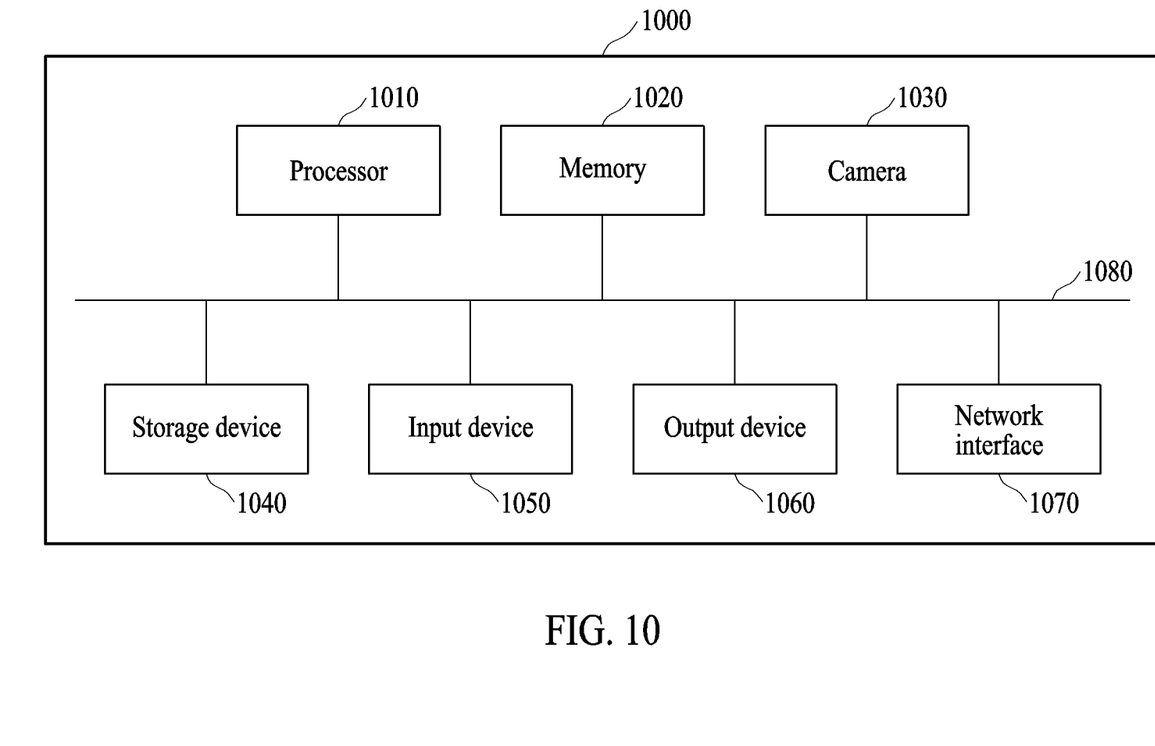
FIG. 10 illustrates an example electronic device according to one or more embodiments.

FIG. 10 illustrates an example electronic device, according to one or more embodiments. Referring to FIG. 10, in a non-limiting example, an electronic device 1000 may include a processor 1010, a memory 1020, a camera 1030, a storage device 1040, an input device 1050, an output device 1060, and a network interface 1070 that may communicate with each other through a communication bus 1080. For example, the electronic device 1000 may be, or part of, a mobile device such as a mobile phone, a smart phone, a personal digital assistant (PDA), a netbook, a tablet personal computer (PC) or a laptop computer, a wearable device such as a smart watch, a smart band or smart glasses, a computing device such as a desktop or a server, a home appliance such as a television (TV), a smart TV or a refrigerator, a security device such as a door lock, or a vehicle such as an autonomous vehicle or a smart vehicle. The electronic device 1000 may be or include the electronic device 900 of FIG. 9.

The processor 1010 may be configured to execute computer readable instructions. For example, the processor 1010 may process instructions stored in the memory 1020 or the storage device 1040, and thereby be configured to perform any one or any combination of the operations or methods described herein, including with reference to FIGS. 1 to 9. The memory 1020 may include a non-transitory computer-readable storage medium or a computer-readable storage device. The memory 1020 may store instructions to be executed by the processor 1010 and may store information associated with software and/or applications when the software and/or applications are being executed by the electronic device 1000.

The camera 1030 may capture a photo and/or record a video. The storage device 1040 may include a computer-readable storage medium or computer-readable storage device. The storage device 1040 may store a greater amount of information than the memory 1020 and store the information for a long period of time. For example, the storage device 1040 may include a magnetic hard disk, an optical disc, a flash memory, a floppy disk, or other non-volatile memories known in the art.

The input device 1050 may receive an input from a user through traditional input methods such as a keyboard and a mouse, and through new input methods such as a touch input, a voice input, and an image input. For example, the input device 1050 may include a keyboard, a mouse, a touch screen, a microphone, or any other device that detects an input from the user and transmits the detected input to the electronic device 1000. The output device 1060 may provide an output of the electronic device 1000 to the user through a visual, auditory, or haptic channel. The output device 1060 may include, for example, a display, a touch screen, a speaker, a vibration generator, or any other device that provides an output to the user. The network interface 1070 may communicate with an external device through a wired or wireless network.

The computing devices, electronic devices, memories, computing device 100, UVM's, CPU's, GPU's, NPU's, processors, processing elements, circuitries, UVM 1120, CPU 120, GPU's 130 and 140, camera 1030, input device 1050, storage device 1040, output device 1060, and communication bus 1080 described herein and disclosed herein described with respect to FIGS. 1-10 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implement method, the method comprising:
    updating memory allocation information of a unified virtual memory (UVM) based on block information of model data blocks used for an execution of a deep learning model by a deep learning framework;
    reflecting of the block information, by an extended unified memory (EUM) runtime and EUM driver provided separately from a UVM runtime and UVM driver of the UVM; and
    performing a least recently used (LRU) eviction based on the updated memory allocation information corresponding to a selected model data block of the model data blocks according to an occurrence of a graphic processing unit (GPU) oversubscription.

2. The method of claim 1, wherein the block information comprises one or more of a portion of a liveness, size, address, and type of the model data blocks.

3. The method of claim 1, wherein the updating of the memory allocation information comprises, in response to a first model data block of the model data blocks corresponding to a weight parameter of the deep learning model, assigning a lowest priority value as an eviction target for the LRU eviction to a first UVM data block of the UVM corresponding to the first model data block.

4. The method of claim 3, wherein the assigning of the lowest priority value to the first UVM data block comprises assigning a negative liveness value to the first UVM data block.

5. The method of claim 1, wherein the updating of the memory allocation information comprises, in response to a second model data block of the model data blocks being newly allocated after a free operation on a previous model data block, initializing a liveness of a second UVM data block of the UVM corresponding to the second model data block.

6. The method of claim 1, wherein the performing of the LRU eviction comprises, in response to a third UVM data block corresponding to an eviction target being matched to a third model data block having a greater size than the third UVM data block, performing eviction on a block group of the UVM matched to the third model data block.

7. The method of claim 1, wherein the LRU eviction is performed based on an LRU list managed through the UVM driver, and
    wherein at least part of a liveness of each UVM data block in the LRU list is adjusted based on the block information.

8. The method of claim 7, wherein the EUM driver specifies a first liveness value of a first model data block of the model data blocks based on the block information, and
    wherein the first liveness value is reflected in the LRU list.

9. An electronic device, comprising:
    a processor configured to execute instructions; and
    a memory storing the instructions, wherein execution of the instructions configures the processor to:
        collect block information on model data blocks used for an execution of a deep learning model by a deep learning framework;
        update memory allocation information of a unified virtual memory (UVM) based on the collected block information;
        reflect the block information, wherein the collecting and the reflecting of the block information are performed by an extended unified memory (EUM) runtime and EUM driver provided separately from a UVM runtime and UVM driver of the UVM; and
        perform a least recently used (LRU) eviction based on the updated memory allocation information.

10. The electronic device of claim 9, wherein the block information comprises one or more of a portion of a liveness, size, address, and type of the model data blocks.

11. The electronic device of claim 9, wherein for the updating of the memory allocation information, the processor is configured to, in response to a first model data block of the model data blocks corresponding to a weight parameter of the deep learning model, assigning a lowest priority value as an eviction target for the LRU eviction to a first UVM data block of the UVM corresponding to the first model data block.

12. The electronic device of claim 11, wherein for the assigning of the lowest priority to the first UVM data block, the processor is configured to assign a negative liveness to the first UVM data block.

13. The electronic device of claim 9, wherein, for the updating of the memory allocation information, the processor is configured to, in response to a second model data block of the model data blocks being newly allocated after a free operation on a previous model data block, initialize a liveness of a second UVM data block of the UVM corresponding to the second model data block.

14. The electronic device of claim 9, wherein for the performing of the LRU eviction, the processor is configured to, in response to a third UVM data block corresponding to an eviction target being matched to a third model data block having a greater size than the third UVM data block, perform an eviction on a block group of the UVM matched to the third model data block.

15. The electronic device of claim 9, wherein the LRU eviction is performed based on an LRU list managed through the UVM driver, and
wherein at least part of a liveness of each UVM data block in the LRU list is adjusted based on the collected block information.

16. The electronic device of claim 15, wherein the EUM driver specifies a first liveness value of a first model data block of the model data blocks based on the collected block information, and
wherein the first liveness value is reflected in the LRU list.

17. A processor-implemented method using a unified verification memory (UVM) that provides a single address space of physical memory of a graphics processing unit (GPU) and physical memory, exterior of the GPU, the method comprising:
executing model data blocks of a neural network using the GPU and the UVM, including:
providing virtual addresses to physical memory of, and exterior to, a physical memory;
reflecting block information of a newly allocated model data block to a related UVM data block; and
assigning a low eviction value, of eviction values for a plurality of UVM data blocks that are weight values of the neural network, to a UVM data block of the plurality of UVM data blocks; and
performing a least recently used (LRU) eviction policy, responsive to a detection of an oversubscription in an operation of the GPU, based on the eviction values.

18. The method of claim 17, further comprising grouping two or more UVM data blocks of the plurality of UVM data blocks according to a combined size of the two or more UVM data blocks with respect to a matched model data block,
wherein the performing of the LRU eviction policy comprises evicting the two or more UVM data blocks according to an eviction value of the two or more UVM data blocks.

19. The method of claim 17, further comprising:
assigning a high eviction value to the related UVM data block.

* * * * *